United States Patent
Coutant et al.

(12) 
(10) Patent No.: US 6,199,202 B1
(45) Date of Patent: Mar. 6, 2001

(54) METHOD AND APPARATUS FOR THE INTER-OPERATION OF DIFFERING ARCHITECTURAL AND RUN TIME CONVENTIONS

(75) Inventors: Cary Coutant, Saratoga; William B. Buzbee, Half Moon Bay; Anthony F. Istvan, San Jose, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/003,573

(22) Filed: Jan. 6, 1998

(51) Int. Cl.[7] .................................................. G06F 9/45
(52) U.S. Cl. ......................................................... 717/10
(58) Field of Search .............................. 395/710; 717/10, 717/5

(56) References Cited

U.S. PATENT DOCUMENTS 5,805,895 * 9/1998 Breternitz, Jr. et al. ............. 395/709
5,828,897 * 10/1998 Kirsch et al. .................... 395/800.43
5,842,017 * 11/1998 Hookway et al. ................... 395/707

OTHER PUBLICATIONS

Chisolm et al. The Use of Computer Language Compilers In Legacy Code Migration. IEEE. pp. 137–145, 1999.*
Dietrich et al. Saving a Legacy with Objects. ACM. pp. 77–83, Oct. 1989.*
Noffsinger et al. Legacy Object Modeling Speeds Software Integration. ACM. pp. 80–89, Dec. 1998.*

Sneed. The Rationale for Software Wrapping. IEEE. pp. 303, 1997.*

* cited by examiner

Primary Examiner—Tariq R. Hafiz
Assistant Examiner—Wei Zhen

(57) ABSTRACT

The inventive mechanism allows an application to switch modes during its operation, between a compatibility or legacy mode for a previous architecture, and a native mode for a current architecture. The mechanism includes an official function descriptor which describes information for accessing a function which resides in one module. The OFD has a legacy portion is useable by a legacy module and a native portion is useable by a native module. The mechanism also includes a linkage table that resides in a second module which references the function in the first module. The portion of the OFD which corresponds to the mode of the linkage table module is copied into the linkage table. Each portion contains one entry that corresponds to an address location of the function, and another entry that is a value for a register which refers to the data segment corresponding to the load module containing the function. The information in the OFD depends on whether the function is a legacy function or a native function.

49 Claims, 2 Drawing Sheets

METHOD AND APPARATUS FOR THE INTER-OPERATION OF DIFFERING ARCHITECTURAL AND RUN TIME CONVENTIONS

REFERENCE TO RELATED APPLICATIONS

Reference is also made to the following co-pending and commonly assigned U.S. patent application entitled METHOD AND APPARATUS FOR GENERAL CODE CACHE MANAGER FOR A DYNAMIC OPTIMIZATION FRAMEWORK, Ser. No. 09/003,568 [PO20US] and U.S. patent application entitled DYNAMIC BINARY TRANSLATION SYSTEM WHICH PERMITS THE SAFE SPECULATION OF TRAPPING OPERATIONS, Ser. No. 09/0035272 [PO21US].

TECHNICAL FIELD OF THE INVENTION

This application relates in general to mode switching, and in specific to a mechanism that allows for switching between legacy code, or code compiled for a previous architecture, and native code, or code compiled for the current architecture, and permits the transfer of control back and forth between the two codes in the same program in a transparent manner.

BACKGROUND OF THE INVENTION

Upon changing to a new instruction set architecture (ISA), it is desirable to continue to be able to support legacy code that was compiled on the old architecture. Thus, the problem is that both the legacy code and the new native code that is compiled specifically for the new architecture must be supported on the new ISA The prior art would typically use binary translation to convert the old code into new code. Binary translation is the process of directly translating object code compiled for the legacy instruction set architecture object code for the native architecture. This allows software transition between two dissimilar ISAs.

However, there are situations when a mixture of legacy code and native code needs to be run, and a binary translation itself will not efficiently handle the two sets of code. Thus, a mechanism for mode switching between the two sets of code is required.

One prior art mechanism used switch stubs. The users had to manually create these switch stubs statically or when the program was developed. The stubs would be positioned between the legacy code and the native code, and when the application wanted to make a mode transition or a switch from emulating the old legacy code to executing the new native code, the application would explicitly transfer control via one of these switch stubs. A mode transition is where the flow of execution in the program switches from legacy code to native code, or vice versa. For the remainder of this application the legacy code will be referred to as compatibility mode code or CM, and the native mode code will be referred to a native mode code or NM.

Another prior art mechanism for performing mode switches used a universal procedure pointer (UPP), which are dynamically created. Thus, before the application makes a call to a routine or procedure that is written in CM, the application would explicitly create a universal procedure pointer for that procedure. The application would take the address of the CM code, and pass it to a system routine that would create a UPP pointer for the CM code. In addition to the address, the application would have to pass additional information about the specific routine or procedure, specifically, a parameter profile. The profile defines the kinds of arguments the procedure call is expecting, so that the universal procedure pointer is built to pass it through a dynamically created stub that would automatically reformat the arguments. This mechanism works similarly in each direction, i.e. from CM to NM, and from NM to CM.

Note that this mechanism is not transparent, if a mode switch is required, it is explicitly made, i.e. the user had to know it was going to be done when writing the program. The application would pass the information about the parameter profile to a stub builder, which is similar to a compiler. The stub builder would take the information and generate the switch stubs as assembly code and then those switch stubs would get compiled into the program. The universal procedure pointer which would point to a little stub.

A serious problem with the prior art mechanisms is that they are not transparent. The user must explicitly know about all the transitions that might be made between compatibility mode and native mode, and prepare for them ahead of time, by either building the switch stubs or creating the code that would dynamically create the UPP. Moreover, the user must be concerned about parameters, because the parameter passing conventions are different between the compatibility mode and native mode procedures. Thus, whenever a procedure call is made that requires a mode switch, either from CM to NM or from NM to CM, the application would have to bundle all of the arguments that are to be passed, and reformat them to match the conventions of the procedure being called. Additional information about the procedure that is being called must be maintained in order to build the switch stub or the UPP. The parameter reformatting or marshalling takes place during run time. Consequently, system performance is adversely affected as well.

Therefore, there is a need in the art to have a mechanism that would allow legacy code or CM which is compiled for an old architecture to be linked with native code or NM which is compiled for the new architecture with no additional effort.

SUMMARY OF THE INVENTION

These and other objects, features and technical advantages are achieved by a system and method that allows compatibility mode code and native mode code to be placed in the same program, and permits the program to transfer control freely back and forth between the two modes in a transparent manner. Thus, the programmer does not have to make any explicit preparations to allow mode switching. Moreover, the switching is performed in an efficient manner so that the calls between modes are not substantially penalized with respect to calls made within the same mode.

In order to allow the inter-operation of disparate code in the same application, it is necessary to detect when an execution thread is attempting to cross a mode boundary, e.g. call a procedure that is written in a different mode. The mode switch must be detected in order to facilitate any necessary conversions between run time architectures and the invocation of any necessary instruction emulators.

The inventive mechanism exploits the fact that position independent code typically uses an indirect method for locating the address and global data offset for the called or target procedure. The method indexes into a procedure label table (PLT), which contains the actual address of the function being called, as well as its linkage pointer, which gives the function access to its data. That information is made available to the linker or dynamic loader via a procedure label (p-label) that exists for each procedure visible outside of a load module. The linker and loader are aware of the type of code in each load module. When the linker or loader detects that a mode boundary is being crossed, instead of instantiating the PLT entry with the actual function address, it will insert the address of a mode switch stub in the emulation sub-system. The p-label has been extended to contain a separate segment for each supported run time/ architecture. The mode switch stub will perform any necessary actions such as converting parameters, switching stacks, invoking the emulator, etc., to facilitate the switching between CM and NM, and vice versa. Once the mode switch is completed, execution of the program will resume at the called procedure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The inventive mode switching mechanism allows the execution of code that conforms to different run time conventions and/or instruction set architecture than that of the current host system. The inventive mechanism permits the mixing of various ISA code combinations within the application, including mode switches to code which is native to the current system and to code which is compiled for a different system.

One aspect of the inventive mechanism is that the parameter passing conventions in the two modes are identical in memory. In other words, the parameter list, which is partially mapped into memory registers, is formatted exactly the same in the two modes. So if a parameter list is passed to memory on CM, or the parameter list is passed on NM, it is formatted exactly the same way. Thus, this eliminates the need for argument reformatting or marshalling, except with respect to register parameters.

Figure 1:
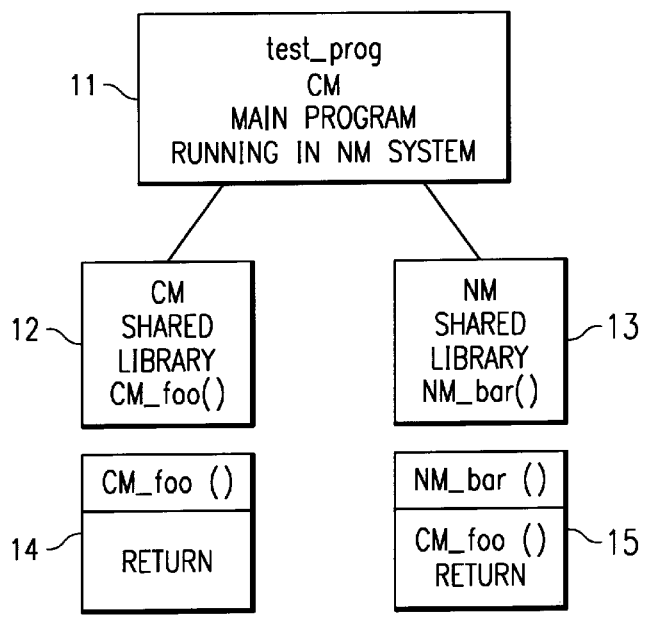
FIG. 1 depicts an example of a main program 11 which is compiled in the legacy code or CM, and linked to two libraries.

FIG. 1 depicts an example of a main program 11 which is compiled in the legacy code or CM, and is being run on a system that uses the native ISA or NM. The main program 11, test_prog, calls two routines, cm_foo() 14 and nm_bar() 15. The two routines are each contained within a respective library, CM shared library 12 and NM shared library 13, respectively. The routine cm_foo() 14 performs some tasks (not shown) and returns. The routine nm_bar () 15 performs some tasks (not shown), calls cm_foo (), and returns. When test_prog is linked to the two libraries as shown, the linker will see two calls from main to the external routines cm_foo() 14 and nm_bar() 15. The linker will create two import stubs and a PLT with two entries. Also, when the shared library containing nm_baro is created, the linker will create one import stub and a PLT with set of one entries for the call to cm_foo().

A load module is a set of code that has been linked together statically, but is not necessarily the entire program. Most modern operating systems have shared libraries or dynamic linked libraries, DLLs, and the linkage between the program and the shared libraries is dynamic. So when the program is loaded, those linkages are established. To make the dynamic linkages work, whenever there is a reference or procedure call from one load module to another load module, a procedure and linkage table entry is built statically, but initialized dynamically, for that reference.

Each procedure linkage table (PLT) entry has two fields, one is the address of the code that is to be branched to in the target load module, and the other field is the linkage table pointer that corresponds to that target load module. Each load module has its own data segment, which contains local data for the code in that load module. The code needs the linkage pointer in order to access that data. So each load module has its own set of private data and linkage table pointer for that data. So whenever a call is made from one load module to another, the linkage table pointer is set to the new value when the second load module is called. Then upon return, the linkage table pointer is restored. The PLT entry has these two fields set up, so when a call is made from one load module to another, the call loads up both of those fields out of the PLT which is local to the calling load module. This establishes the linkage. This has the pointers into the load module that is being called. So the one field is a pointer to the code, and this address is going to be loaded up into the register, and then make an indirect branch through it. The other field is the linkage table pointer which is loaded into a fixed register that is reserved for that purpose. The load module expects to have that linkage table pointer pointing to its own data so each load module can establish addressability to its own data.

Figure 2:
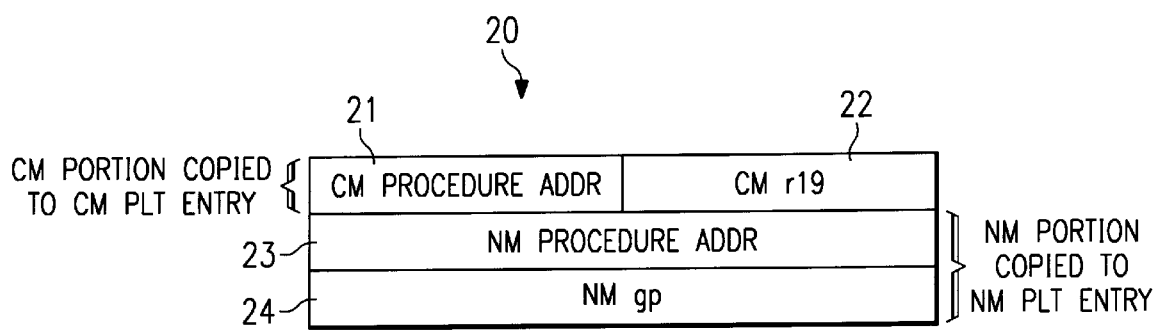
FIG. 2 depicts a mixed-mode official function descriptor (OFD)

Another aspect of the inventive mechanism involves the official function descriptor (OFD), which is an extension of a function descriptor or a p-label. FIG. 2 depicts a mixed-mode OFD 20. The format of an official function descriptor (OFD) in mixed-mode is constructed such that all existing CM code which uses OFDs, and dynamic indirect calling routines, only references the first two 32-bit words, 21, 22. Moreover, using this 32-bit CM run-time convention, all 32-bit NM code which uses OFDs will ignore the first two 32-bit words. In other words, the OFDs for the new NM mode system are designed such that CM mode code can operate with the NM mode OFDs, since their required information is where it is expected to be located. PLT entries are filled in directly from the corresponding fields of the OFD. This mapping may only be conceptual since an OFD is only manifested when it is actually needed. Note, there must only be one OFD created per function per application.

Indirect procedure calls are calls which are performed using a function pointer, which points to an OFD. Function pointers come in two varieties: internal and external. An internal function pointer is actually the address of the routine and is used only in fully archive-bound CM mode. External function pointers, which are used by mixed applications, are pointers to their associated OFD. In CM code, indirect calls are usually done through a dynamic calling routine, which references into the OFD to locate the actual procedure address and its linkage pointer, or gp value. The indirect call process completes by attempting to branch to the actual procedure address. At this point, the same address map lookup mechanism used in direct calls will trigger a mode-switch, if necessary. In NM code, the functionality of the dynamic calling routine is performed inline. The gp address 24 will be loaded into the appropriate register and a branch to the address contained in the second 64-bit word 23 of the OFD 20 will occur. If a mode-switch is required, this word 23 will contain the address of the mode-switch stub.

An import stub is built by the linker to handle direct calls when the target is not in the same load module and the import stub references the PLT. Since, the target of the call is not in the same module, dynamic linkage becomes a concern. The actual address of that code and the new gp value must be retrieved because flow is moving from one load module to another. The import stub resides in the load module that is making the call.

The mode switch, if necessary, will occur after the import stub has loaded up the contents of the PLT entry and branches to the address from the PLT entry. Note that the import stub does not know that it might be making a mode switch, it believes that it is calling a different mode module and with a new gp value that it needs to set-up so that the called module can access its own data. For example, suppose there are load modules A and B, and module A is calling a routine in module B. Thus, the import stub and the PLT entry it refers to are all in module A. The routine in load module B has an OFD and the code itself for that procedure in load module B. Suppose the particular PLT entry represents the reference to function foo in load module B, so the dynamic loader locates the definition of function foo, finds that it is in load module B. The dynamic loader copies the contents of the OFD over to the PLT entry in load module A. The OFD is the source for the two values used in the PLT entry. Depending on the mode of the code in load module A, the loader will copy either the CM part or the NM part of the OFD to the PLT. Once that is done, the binding is set and the function call will work direct calls. Indirect calls will use a function pointer that points directly to the OFD.

Note that the use of the mixed-mode OFD 20 is how transparency is established. So whenever an indirect call is made from one load module to another, it goes through OFD, note that direct calls go through the PLT derived from the OFD. This PLT entry allows the GP value to be set for the load module where control is about to be transferred to. So once control reaches that new load module, it has a linkage table pointer, or global pointer (gp), that it can use to address its own data, which includes its linkage value. So those gp values are used to address not only the linkage table for that load module which contains the things that need to be able to make references outside that load module, it also allows the data to be addressed that is private to that load module. So the OFD represents a definition of a procedure. Note that the locations of the entries or offsets in the OFD are purposely placed such that both CM and NM code can use the same OFD. CM mode code will look to 0 bytes offset and 4 bytes offset. NM code will look to 8 bytes offset and 16 bytes offset. A pure CM mode OFD would be two 4 byte entries for 8 bytes total, while a pure native mode OFD would be 16 bytes long, with two 8 byte entries.

Note that half the OFD 20 will contain information for a mode switch rather than an actual code address. For example, if the OFD 20 is for a NM procedure, then the CM portion 21, 22 will contain mode switch information. Likewise, if the OFD 20 is for a CM procedure, then the NM portion 23, 24 will contain the mode switch information. The information in the address portion, either 21 or 23 is the address of a mode switch stub. This stub is a routine that will perform the necessary actions to facilitate the mode switch. The r19 22 or the gp 24 value that we expect to find there is not necessarily a real gp value, but is rather additional information required for the switch. It provides the information to set the code address and the GP value correctly for the new mode.

Figure 3A:
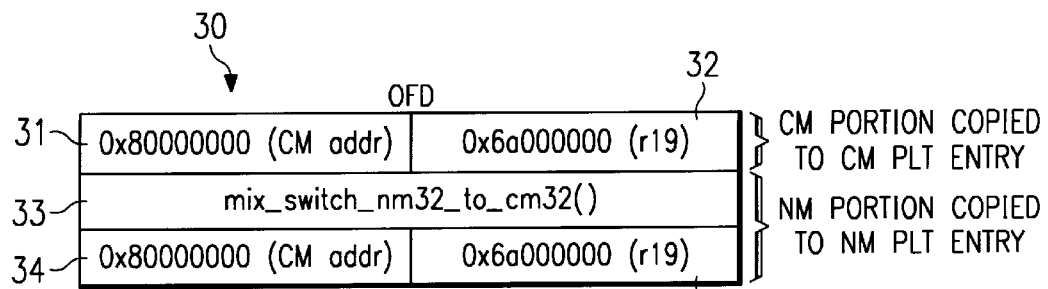
FIGS. 3A and 3B respectively depict the OFD and PLT entries created for cm_foo procedure contained in one of the linked CM shared library of FIG. 1.
Figure 3B:
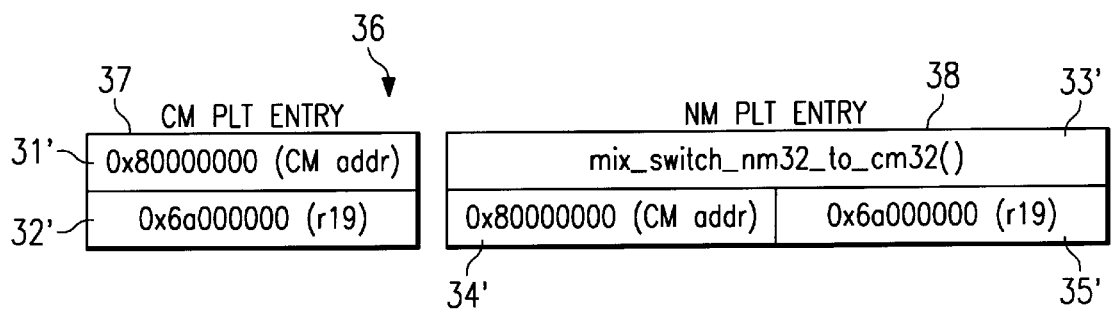

Assume that dynamic loader loads the CM shared library containing cm_foo() into memory, such that cm_foo starts at address 0x80000000, and that cm_foo()'s r19 data pointer has the value 0x6a000000. r19 is register 19, which is set aside for the purpose of gp, or global pointer. The OFD 30 and PLT 36 entries created by loader for cm_foo are shown in FIGS. 3A and 3B, respectively. The PLT in FIG. 3B would be in the calling load module (or could be the main program). Note that cm_foo() is called in two places in test_prog(), once in the main program, and once by nm_bar(). When the dynamic loader uses the OFD to initialize the PLT entry for cm_foo() in the main program, it will copy the CM portion 31, 32 of the descriptor into the PLT 37. When dynamic loader initializes the PLT 38 for nm_bar(), it will use the NM portion 33, 34, 35 of the descriptor, since nm_bar() is in a NM shared library. To facilitate the initialization of the PLTs, the OFD is constructed such that each entry is set to a specific offset. The CM address 31 is set to 0 bytes offset, the CM r19 value 32 is set to 4 bytes offset, the NM address 33 is set to 8 bytes offset, and the NM gp entry 34 begins at 16 bytes offset with a second entry 35 at 20 bytes offset.

When cm_foo() is directly called from the main program (which is a CM function), a branch will occur to the import stub for cm_foo(). The value 0x6a000000 will be copied to r19 31', and then the program will branch to 0x80000000 32'. No mode switch will occur since a CM function is calling a CM function.

However, when cm_foo() is indirectly called from nm_bar() through this OFD 30 a mode switch is required. The main program call to nm_bar() will be described later, assume that the current mode is NM, and nm_bar() is being executed. When nm_ba() calls the import stub for cm_foo(), the import stub loads the second 64-bit word 34', 35' of the PLT 38 into the global pointer register and branches to mix_switch_nm32_to_cm32() 33'. mix_switch_nm32_to_cm32() is the routine or switch stub, which will perform the mode switch, and will be specific for every architectural pairing (e.g. mix_switch_nm64_to_cm64. mix_switch_nm32_to_cm32() will extract the actual CM branch target and CM target r19 value from the 64-bit word, in preparation of switching modes, and set its own gp.

Note the NM gp entry 34, 35 is actually a copy of the CM address 31 and the CM r19 value 32. This is because a mode switch is occurring when this OFD is called by an NM procedure. The NM procedure should not jump to compatibility mode code, because the NM processor cannot directly execute the compatibility mode code, it must be emulated. Thus, a native mode code that is calling a compatibility mode procedure cannot just jump right to the compatibility mode code. If it did such a jump, the machine would crash. Instead, the NM mode jumps to the emulator, and the value in NM address 33 is the address to the emulator or translator.

In other words, it is the address of an entry point to the procedure that switches to the compatibility mode emulation.

Note that the indirect call from native mode has not only branched to the emulator address, but it has also loaded up the double word 34, 35 into the gp register. So now the switch stub has those two values accessible in the gp register. The emulator then pulls out the 2 parts of that double word and uses those as the actual compatibility mode values that it needs, i.e. where to retrieve the CM code that needs to be emulated into NM code. It can then switch into compatibility mode emulation and complete the call, because now it has the compatibility mode code address and r19 value.

The reason for the jump to the emulator is that hardware executes NM code. The program can have multiple branches to most anywhere, so long as all of the modules are using NM code. But as soon as a branch to compatibility mode code is needed, the address of the CM code cannot be placed into the function descriptor of a native mode procedure, because the native mode code would attempt to jump directly to the CM code. So instead of jumping to the CM code, a jump to the emulator is made instead.

Figure 4A:
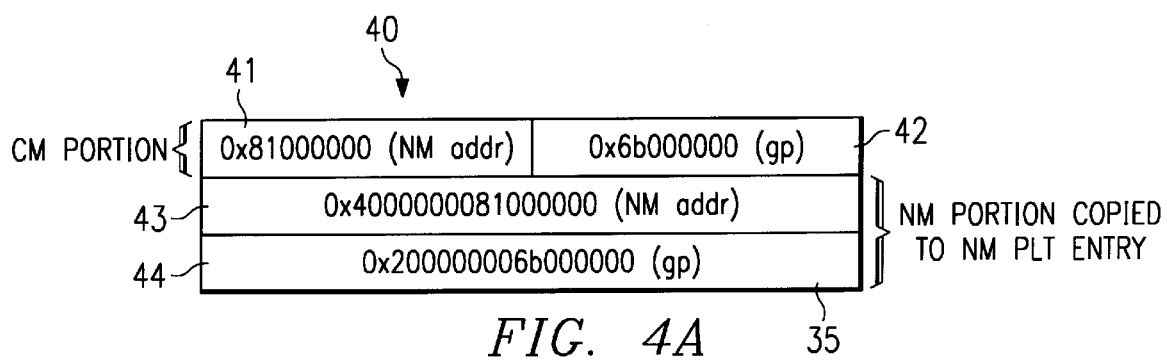
FIGS. 4A and 4B respectively depict the OFD and PLT entries created for nm_bar procedure contained in the linked NM shared library of FIG. 1.
Figure 4B:
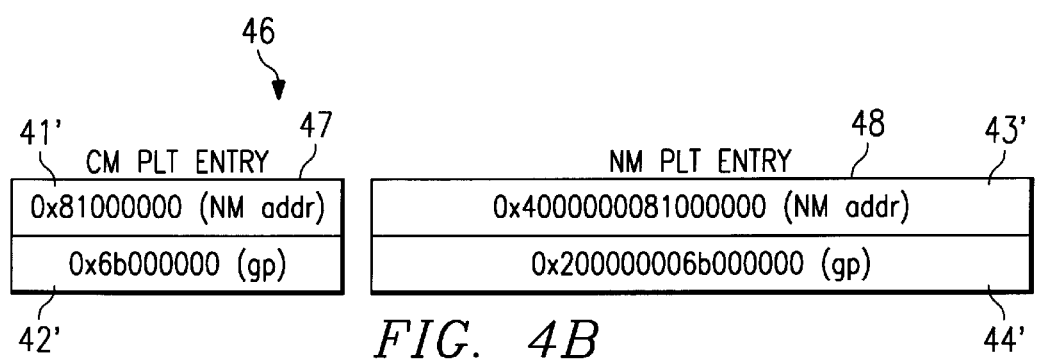

Assume that the dynamic loader loads the NM shared library containing nm_bar() into memory such that nm_bar starts at address 0x8100000, and that gp of nm_bar() has the value 0x6b000000. The OFD 40 and PLT 46 entries created by loader for nm_bar are shown in FIG. 4A and 4B, respectively. When the dynamic loader uses the OFD to initialize the PLT entry for nm_bar() in the main program, it will copy the CM portion 41, 42 of the descriptor into the PLT 47. To facilitate the initialization of the PLTs, the OFD is constructed such that each entry is set to a specific offset. The CM address 41 is set to 0 bytes offset, the CM r19 value 42 is set to 4 bytes offset, the NM address 43 is set to 8 bytes offset, and the NM gp entry 44 is set to 16 bytes offset.

When the main program, which is CM, calls the import stub for nm bar(), it will load the gp value 42' into the emulated r19, and attempt to perform an indirect branch to the address of the NM function 41'. Note that all CM indirect branches are emulated by an emulator using an address lookup mechanism. Normally, a lookup of a CM address would yield the address of the native code translation for that address, or fail, indicating that the branch target is CM code that is to be emulated. However, in this case the address map will recognize that the target address is in a NM code range that was registered by loader. An entry in the address map will be made for this function for any future mode-switch attempts. The switch stub mixed_switch_pa32_to_em32 will then be directly invoked by the emulator. The mode switch code can then extract the r19 value 42' from the NM gp register and continue into emulation mode for the targeted function. The first word of the OFD must be the actual function address to allow for successful function pointer comparison of EM function pointers in CM code.

Note that the CM PLT entry 47 of FIG. 4B is exactly what a CM module would expect to find in a load module that has been compiled in compatibility mode. For example, suppose that a call is being made from a compatibility mode module to a native load mode module, then a compatibility mode PLT entry will be found in the CM load module. This is stored in the compatibility mode load module making the call. So the linkage table pointer is pointing to its linkage table, in which this PLT entry is found.

Now this PLT entry is actually a reference to a procedure in another load module and so in the process of making the call through this PLT entry, the flow of control is going to be transferred to another load module, which in this situation, is going to change from compatibility mode to native mode. So in the process of doing this it is going to grab the two fields, code address 41 and linkage table pointer 42, shown here as gp or global pointer. Note that the OFD r19 value will be the same for every function OFD in a given load module, because all functions within a load module share the same gp value. However, each PLT entry might have a different r19 value, because each PLT entry represents a different function that is being called, and each function might be in a different load module. PLTs represents references to other load modules, while OFDs represent the functions that are defined in a particular load module. So when establishing the linkages at load time, the dynamic loader will go through, and for every PLT entry in a load module, finds the definition of that procedure and copies the OFD for that procedure into the PLT entry. Once those two values are in the PLT, then code which needs to make a call is going to find the correct two values in its local PLT entry, and it is going to be able to make the jump, by setting the gp value and branching to the correct address.

Note that the OFD 40 of FIG. 4A is located in a different module, i.e. the NM shared library 13, from that of the main program. So the native mode portion 43, 44 is a normal NM function descriptor. A NM to NM call loads the new gp value, and branches to the code address.

However, suppose the NM function is called by the CM main program, which has the emulator emulating CM code, and the emulator is emulating an indirect call. The program will attempt to branch to the address that was recorded in the CM PLT entry 41'. However, since the current mode is CM with emulation, the program cannot directly jump to NM code, because the emulator would then attempt to interpret the code as if it were CM when it is not.

To fully understand how the mode is switched from CM to NM, an understanding of the emulator is required. The emulator uses dynamic translation technology. It maintains a cache of native mode translations for compatibility mode code sequences, so whenever a branch instruction is emulated, the cache is searched for the address of the branch to see if this code has already been translated. If the code has not been translated, i.e. it is not in the cache, then this code is fetched and emulated. Moreover, if the code is been frequently called than it may be dynamically translated dynamically to native code and stored in the cache. A branch to the CM address code which has been translated and is in the cache, can be jumped to as native code. With respect to a CM to NM mode switch, every time there is an OFD for a native mode procedure, the address of that procedure is registered in the code cache. So now whenever there is a branch to that native mode address from a CM call, the emulator is going to look up that address in its code cache. It will discover that it has a "translation" for it, because it is registered that with the emulator. Thus, the emulator knows that the code at that address is not compatibility mode code, but in fact it is native code. So at that point it recognizes that it needs to make a mode switch and it is going to call the mode switch stub to switch from CM to NM modes. Notice that the CM portions are the same as the NM portions, except the CM portion is a 32 bit representation of the 64 NM value. This is because the emulator can notice that it is making a call to NM code. In comparison with FIG. 3, the same mechanism could not be used, because in FIG. 3, the emulator is not running, but rather the NM hardware is running, and a branch would result in a real branch operation without the registry check, and thus would expect to find NM code. Therefore, the two directions are asymmetrical, i.e CM to NM is not the same as NM to CM.

Note that if the load module is a native mode module, every PLT entry in there is going to be the NM portion of an OFD. The dynamic loader copies one half or the other of the OFD into the PLT entry, because it knows the mode of each load module. Thus, when it is initializing the PLT entries for load module A, if load module A is compatibility mode load module, the dynamic loader copies the CM portion of every OFD it finds to the corresponding PLT entry. If it is NM load module, then it copies the NM portions of each. That way the direct calls work just like the indirect calls do. Therefore, if it's a CM to NM call, an emulated branch to NM code is performed and the emulator recognizes that a jump to a registered NM entry point is being performed. If it is a NM to CM call, then the address on the PLT entry is actually the address of the mode switch routine which extracts the CM address for emulation and the r19 value from the gp register.

Note that FIGS. 3 and 4 depict the CM mode code as 32 bit code with the CM portion being half the size of the 64 bit NM. However, the CM mode may be 64 bit as well, in which case the portions are the same size. Moreover, the inventive mechanism is not limited to any particular bit size and may be used with any sized ISA.

Although the present invention and its advantages have been described in detail, it should be understood that various changes, substitutions and alterations can be made herein without departing from the spirit and scope of the invention as defined by the appended claims.

What is claimed is:

1. A method for operating an application in a current host system including at least one legacy module compiled for a legacy architecture, and at least one native module compiled for an architecture native to said current host system, the method comprising the steps of:

providing a first function descriptor which describes information for accessing a function which resides in a first module, and includes a legacy portion which would be useable by the at least one legacy module and a native portion which would be useable by the at least one native module wherein said at least one legacy module and said at least one native module execute within said current host system; and copying, by a second module which references the function, one of the legacy portion and the native portion depending for which architecture the second module is compiled, into a linkage table residing in the second module.

2. The method of claim 1, wherein:

each portion of both the legacy portion and the native portion have two entries, with one entry corresponding to an address location of the function, and the other entry comprising a value for a register which refers to data corresponding to the first module which contains the function.

3. The method of claim 2, wherein:

each entry of the legacy portion is a 32 bit word; and
each entry of the native portion is a 64 bit word.

4. The method of claim 3, wherein the step of providing comprises the steps of:

offsetting the one entry of the legacy portion to zero bytes;
offsetting the other entry of the legacy portion to four bytes;
offsetting the one entry of the native portion to eight bytes; and
offsetting the other entry of the native portion to sixteen bytes.

5. The method of claim 2, wherein:

each entry of the legacy portion is a 64 bit word; and
each entry of the native portion is a 64 bit word.

6. The method of claim 5, wherein the step of providing comprises the steps of:

offsetting the one entry of the legacy portion to zero bytes;
offsetting the other entry of the legacy portion to eight bytes;
offsetting the one entry of the native portion to sixteen bytes; and
offsetting the other entry of the native portion to twenty four bytes.

7. The method of claim 2, wherein the step of providing comprises the steps of:

offsetting the one entry of the legacy portion by a first member of bytes;
offsetting the other entry of the legacy portion by a second number of bytes;
offsetting the one entry of the native portion by a third number of bytes; and
offsetting the other entry of the native portion by a fourth number of four bytes.

8. The method of claim 1, further comprising the step of:

linking, dynamically, the first and second modules to the application.

9. The method of claim 1, wherein the first and second modules are both legacy modules, and the step of copying comprises the steps of:

copying a first entry of the legacy portion into the linkage table, wherein the first entry is a legacy mode address to the function; and copying a second entry of the legacy portion into the linkage table, wherein the second entry is a register value pointer to data.

10. The method of claim 9, further comprising the steps of:

branching to the address of the function; and
executing the function via emulation.

11. The method of claim 1, wherein the first and second modules are both native modules, and the step of copying comprises the steps of:

copying a first entry of the native portion into the linkage table, wherein the first entry is a native mode address to the function; and copying a second entry of the native portion into the linkage table, wherein the second entry is a register value pointer to data.

12. The method of claim 11, further comprising the steps of:

branching to the address of the function; and
executing the function.

13. The method of claim 1, wherein the first module is a native module and the second module is a legacy module, and the step of copying comprises the steps of:

copying a first entry of the legacy portion into the linkage table, wherein the first entry is a native mode address to the function; and copying a second entry of the legacy portion into the linkage table, wherein the second entry is a register value pointer to data.

14. The method of claim 13, further comprising the steps of:

registering the native mode address in a cache;

emulating the first module;

invoking the function;

consulting the cache to determine if the function is registered;

invoking a mode switch mechanism, if the function is registered, to switch application operation from legacy mode to native mode;

branching to the address of the function; and executing the function.

15. The method of claim 1, wherein the first module is a legacy module and the second module is a native module, and the step of copying comprises the steps of:

copying a first entry of the native portion into the linkage table, wherein the first entry is a value which invokes a mode switch mechanism to switch application operation from native mode to legacy mode; and copying a second entry of the native portion into the linkage table, wherein the second entry comprises two sub-entries, a first sub-entry is a legacy mode address to the function, and a second sub-entry is a register value pointer to data.

16. The method of claim 15, further comprising the steps of:

executing the first module;

invoking the function;

invoking the mode switch mechanism;

branching to an emulator;

extracting the first sub-entry and the second sub-entry, and emulating the function at the address of the first sub-entry.

17. A system for operating an application in a current host system including at least one legacy module compiled for a legacy architecture, and at least one native module compiled for an architecture native to said current host system the system comprising:

a first function descriptor which describes information for accessing a function which resides in a first module, and includes a legacy portion which would be useable by the at least one legacy module and a native portion which would be useable by the at least one native module, wherein said at least one legacy module and said at least one native module execute within said current host system; and a linkage table residing in a second module which references the function, into which is copied one of the legacy portion and the native portion depending for which architecture the second module is compiled.

18. The system of claim 17, wherein:

each portion of both the legacy portion and the native portion have two entries, with one entry corresponding to an address location of the function, and the other entry comprising a value for a register which refers to data corresponding to the first module which contains the function.

19. The system of claim 18, wherein:

each entry of the legacy portion is a 32 bit word; and each entry of the native portion is a 64 bit word.

20. The system of claim 19, wherein:

the one entry of the legacy portion is offset to zero bytes;

the other entry of the legacy portion is offset to four bytes;

the one entry of the native portion is offset to eight bytes; and the other entry of the native portion is offset to sixteen bytes.

21. The system of claim 18, wherein:

each entry of the legacy portion is a 64 bit word; and each entry of the native portion is a 64 bit word.

22. The system of claim 21, wherein:

the one entry of the legacy portion is offset to zero bytes;

the other entry of the legacy portion is offset to eight bytes;

the one entry of the native portion is offset to sixteen bytes; and the other entry of the native portion is offset to twenty four bytes.

23. The system of claim 18, wherein:

the one entry of the legacy portion is offset by a first number of bytes;

the other entry of the legacy portion is offset by a second number of bytes;

the one entry of the native portion is offset by a third number of bytes; and the other entry of the native portion is offset by a fourth number of bytes.

24. The system of claim 17, further comprising:

means for dynamically linking the first and second modules to the application.

25. The system of claim 17, wherein the first and second modules are both legacy modules, and the system further comprises:

means for copying a first entry of the legacy portion into the linkage table, wherein the first entry is a legacy mode address to the function; and means for copying a second entry of the legacy portion into the linkage table, wherein the second entry is a register value pointer to data.

26. The system of claim 25, further comprising:

means for branching to the address of the function; and means for executing the function via emulation.

27. The system of claim 17, wherein the first and second modules are both native modules, and the system further comprises:

means for copying a first entry of the native portion into the linkage table, wherein the first entry is a native mode address to the function; and means for copying a second entry of the native portion into the linkage table, wherein the second entry is a register value pointer to data.

28. The system of claim 27, further comprising:

means for branching to the address of the function; and means for executing the function.

29. The system of claim 17, wherein the first module is a native module and the second module is a legacy module, and the system further comprises:

means for copying a first entry of the legacy portion into the linkage table, wherein the first entry is a native mode address to the function; and means for copying a second entry of the legacy portion into the linkage table, wherein the second entry is a register value pointer to data.

30. The system of claim 29, further comprising:

means for registering the native mode address in a cache;

means for emulating the first module;

means for invoking the function;

means for consulting the cache to determine if the function is registered;

means for invoking a mode switch mechanism, if the function is registered, to switch application operation from legacy mode to native mode;

means for branching to the address of the function; and means for executing the function.

31. The system of claim 17, wherein the first module is a legacy module and the second module is a native module, and the system further comprises:

means for copying a first entry of the native portion into the linkage table, wherein the first entry is a value which invokes a mode switch mechanism to switch application operation from native mode to legacy mode; and means for copying a second entry of the native portion into the linkage table, wherein the second entry comprises two sub-entries, a first sub-entry is a legacy mode address to the function, and a second sub-entry is a register value pointer to data.

32. The system of claim 31, further comprising:

means for executing the first module;

means for invoking the function;

means for invoking the mode switch mechanism;

means for branching to an emulator;

means for extracting the first sub-entry and the second sub-entry; and means for emulating the function at the address of the first sub-entry.

33. A computer program product having a computer readable medium having computer program logic recorded thereon for operating an application in a current host system including at least one legacy module compiled for a legacy architecture, and at least one native module compiled for an architecture native to said current host system, the computer program product comprising:

code for providing a first function descriptor which describes information for accessing a function which resides in a first module, and includes a legacy portion which would be useable by the at least one legacy module and a native portion which would be useable by the at least one native module, wherein said at least one legacy module and said at least one native module execute within said current host system; and code for copying, by a second module which references the function, one of the legacy portion and the native portion depending for which architecture the second module is compiled, into a linkage table residing in the second module.

34. The computer program product of claim 33, wherein:

each portion of both the legacy portion and the native portion have two entries, with one entry corresponding to an address location of the function, and the other entry comprising a value for a register which refers to data corresponding to the first module which contains the function.

35. The computer program product of claim 34, wherein:

each entry of the legacy portion is a 32 bit word; and each entry of the native portion is a 64 bit word.

36. The computer program product of claim 35, wherein the code for providing comprises:

code for offsetting the one entry of the legacy portion to zero bytes;

code for offsetting the other entry of the legacy portion to four bytes;

code for offsetting the one entry of the native portion to eight bytes; and code for offsetting the other entry of the native portion to sixteen bytes.

37. The computer program product of claim 34, wherein:

each entry of the legacy portion is a 64 bit word; and each entry of the native portion is a 64 bit word.

38. The computer program product of claim 37, wherein the code for providing comprises:

code for offsetting the one entry of the legacy portion to zero bytes;

code for offsetting the other entry of the legacy portion to eight bytes;

code for offsetting the one entry of the native portion to sixteen bytes; and code for offsetting the other entry of the native portion to twenty four bytes.

39. The computer program product of claim 34, wherein the code for providing comprises:

code for offsetting the one entry of the legacy portion by a first number of bytes;

code for offsetting the other entry of the legacy portion by a second number of bytes;

code for offsetting the one entry of the native portion by a third number of bytes; and code for offsetting the other entry of the native portion by a fourth number of four bytes.

40. The computer program product of claim 33, further comprising:

code for linking, dynamically, the first and second modules to the application.

41. The computer program product of claim 33, wherein the first and second modules are both legacy modules, and the step of copying comprises the steps of:

copying a first entry of the legacy portion into the linkage table, wherein the first entry is a legacy mode address to the function; and copying a second entry of the legacy portion into the linkage table, wherein the second entry is a register value pointer to data.

42. The computer program product of claim 41, further comprising:

code for branching to the address of the function; and code for executing the function via emulation.

43. The computer program product of claim 33, wherein the first and second modules are both native modules, and the code for copying comprises:

code for copying a first entry of the native portion into the linkage table, wherein the first entry is a native mode address to the function; and code for copying a second entry of the native portion into the linkage table, wherein the second entry is a register value pointer to data.

44. The computer program product of claim 43, further comprising:

code for branching to the address of the function; and code for executing the function.

45. The computer program product of claim 33, wherein the first module is a native module and the second module is a legacy module, and the code for copying comprises:

code for copying a first entry of the legacy portion into the linkage table, wherein the first entry is a native mode address to the function; and code for copying a second entry of the legacy portion into the linkage table, wherein the second entry is a register value pointer to data.

46. The computer program product of claim 45, further comprising:

code for registering the native mode address in a cache;

code for emulating the first module;

code for invoking the function;

code for consulting the cache to determine if the function is registered;

code for invoking a mode switch mechanism, if the function is registered, to switch application operation from legacy mode to native mode;

code for branching to the address of the function; and code for executing the function.

47. The computer program product of claim 33, wherein the first module is a legacy module and the second module is a native module, and the code for copying comprises:

code for copying a first entry of the native portion into the linkage table, wherein the first entry is a value which invokes a mode switch mechanism to switch application operation from native mode to legacy mode; and code for copying a second entry of the native portion into the linkage table, wherein the second entry comprises two sub-entries, a first sub-entry is a legacy mode address to the function, and a second sub-entry is a register value pointer to data.

48. The computer program product of claim 47, further comprising:

code for executing the first module;

code for invoking the function;

code for invoking the mode switch mechanism;

code for branching to an emulator;

code for extracting the first sub-entry and the second sub-entry; and code for emulating the function at the address of the first sub-entry.

49. A system for operating an application in a current host system including at least one legacy module compiled for a legacy architecture, and at least one native module compiled for an architecture native to said current host system, the system comprising:

a first function descriptor which describes information for accessing a function which resides in a first module, and includes a legacy portion which would be useable by the at least one legacy module and a native portion which would be useable by the at least one native module;

a linkage table residing in a second module which references the function, into which is copied one of the legacy portion and the native portion depending upon which architecture the second module is compiled for, into a linkage table residing in the second module; and an emulator for emulating code in said at least one legacy module.

* * * * *